US007313134B2

(12) United States Patent
Yarlagadda

(10) Patent No.: US 7,313,134 B2
(45) Date of Patent: Dec. 25, 2007

(54) PROXY SERVER FOR RELAYING VOIP MESSAGES

(75) Inventor: Madhu Yarlagadda, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 230 days.

(21) Appl. No.: 11/128,634

(22) Filed: May 12, 2005

(65) Prior Publication Data

US 2006/0256771 A1 Nov. 16, 2006

(51) Int. Cl.
*H04L 12/66* (2006.01)
(52) U.S. Cl. .................. 370/352; 370/401; 370/466
(58) Field of Classification Search ............... 370/352, 370/210, 291, 201, 286; 375/232, 285; 455/296
See application file for complete search history.

(56) References Cited

U.S. PATENT DOCUMENTS

| 6,075,796 | A | 6/2000 | Katseff et al. |
| 6,567,419 | B1 | 5/2003 | Yarlagadda |
| 6,934,279 | B1* | 8/2005 | Sollee et al. ............... 370/352 |
| 2002/0186683 | A1* | 12/2002 | Buck et al. ................. 370/352 |
| 2003/0219011 | A1* | 11/2003 | Han ........................... 370/352 |
| 2004/0001224 | A1 | 1/2004 | Kajiwara |
| 2004/0032860 | A1 | 2/2004 | Mundra et al. |
| 2004/0109023 | A1* | 6/2004 | Tsuchiya .................... 345/758 |
| 2004/0160979 | A1 | 8/2004 | Pepin et al. |
| 2004/0249963 | A1 | 12/2004 | Klaghofer et al. |
| 2005/0117605 | A1* | 6/2005 | Yan et al. ................... 370/469 |
| 2006/0256721 | A1 | 11/2006 | Yarlagadda et al. |
| 2006/0256772 | A1 | 11/2006 | Yarlagadda |
| 2006/0256776 | A1 | 11/2006 | Gladyshev et al. |
| 2006/0256780 | A1* | 11/2006 | Diroo et al. ................ 370/356 |
| 2006/0256816 | A1 | 11/2006 | Yarlagadda et al. |
| 2006/0268828 | A1 | 11/2006 | Yarlagadda |

FOREIGN PATENT DOCUMENTS

| EP | 1 161 038 A2 | 12/2001 |
| WO | WO-01/78430 | 10/2001 |

\* cited by examiner

*Primary Examiner*—Sanh D. Phu
(74) *Attorney, Agent, or Firm*—Darby & Darby PC; Jamie L. Wiegand

(57) ABSTRACT

A system, method, and apparatus are directed towards managing a Voice over IP (VOIP) message over a network, where the VOIP message may employ the Real-time Transport Protocol (RTP) and possibly Session Initiation Protocol (SIP) over the User Datagram Protocol (UDP). The invention enables a VOIP client device, such as an IP phone, and the like, to communicate a message to a local proxy residing on a local computing device. The communications between the VOIP device and the local proxy may employ SIP/RTP over UDP. Upon receipt of the communications, the local proxy converts the transport protocol to another transport protocol, such as Transmission Control Protocol (TCP). The local proxy may also perform a port translation on the message. The converted communications may then be sent to a remote server, where it may be employed in its present SIP/RTP over TCP format, or be converted back to using UDP.

20 Claims, 5 Drawing Sheets

PROXY SERVER FOR RELAYING VOIP MESSAGES

BACKGROUND OF THE INVENTION

The present invention relates generally to network communications, and more particularly, but not exclusively, to a system and method for relaying a Voice over Internet Protocol (VOIP) Session Initiation Protocol/Real-time Transport Protocol (SIP/RTP) message over a network.

Internet Protocol (IP) Telephony, also known as Voice over Internet Protocol (VOIP), is a technology that makes it possible to have a voice conversation over an IP network, such as the Internet, instead of a dedicated voice transmission line.

Depending on the service, one way to place a VOIP call is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to be able to integrate at least some of the VOIP features with a variety of other communication services.

However, because IP does not by default provide any mechanism to ensure that data packets are delivered in sequential order, or provide any quality of service guarantees, many implementations of VOIP face problems dealing with latency and/or possible data integrity issues. Another problem with at least some of the VOIP implementations is that they may be unable to provide VOIP traffic through firewalls, network address translation (NAT) devices, and the like. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for managing a Voice over IP (VOIP) message over a network, where the VOIP message may employ the Real-time Transport Protocol (RTP) and Session Initiation Protocol (SIP) over the User Datagram Protocol (UDP). The invention enables a VOIP device, such as an IP phone, and the like, to send the message to a local proxy residing on a local computing device, within the IP phone, or the like. The communications between the VOIP device and the local proxy may employ RTP (and possibly SIP) over UDP. Upon receipt of the communications, the local proxy may convert the employed transport protocol to another transport protocol, such as Transmission Control Protocol (TCP). The local proxy may also, or instead, perform a port translation on the communications. The converted communications may then be sent to a remote server, where it may be employed in its present format, or be converted back to another transport protocol, port, or the like. By employing the TCP transport protocol, and/or port translation, or the like, the invention may improve the likelihood that the VOIP message will be routed through a firewall, NAT, and the like. However, the invention is limited to converting the communications from UDP to TCP, and/or performing a port translation. For example, the local proxy may also employ encapsulation, or the like, to enable the communications to be tunneled through various connections, including an HTTP connection, IM connection, and the like.

Illustrative Operating Environment

Figure 1:
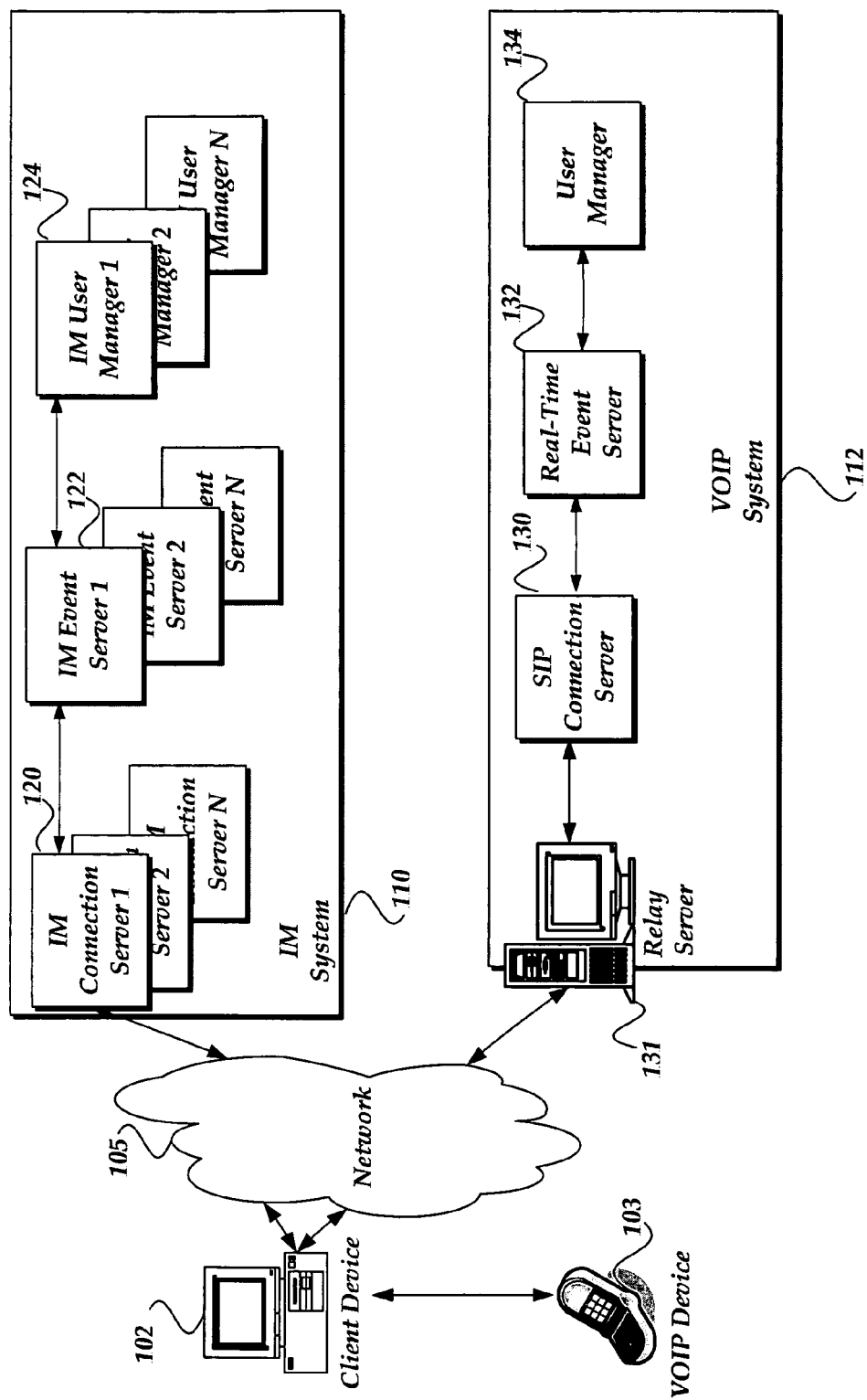
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client device 102, VOIP device 103, network 105, IM system 110, and VOIP system 112. IM system 110 may include IM connection servers 120, IM event servers 122, and IM user managers 124. VOIP system 112 includes relay server 131, SIP connection server 130, Real-Time event server 132, and user manager 134.

Client device 102 is in communication with IM connection servers 120 and relay server 131 through network 105. Client device 102 is also in communication with VOIP device 103. IM event servers 122 are in communication with IM connection servers 120 and IM user managers 124.

Real-time event server 132 is in communication with SIP connection server 130 and user manager 134. SIP connection server 130 is also in communication with relay server 131.

VOIP device 103 may include virtually any device that is arranged to send and receive voice communications and messages such as VOIP message via one or more wired and/or wireless communication interfaces. Typically, VOIP device 103 may be configured to communicate using any of a variety of protocols. For example, VOIP device 103 may be configured to employ RTP for communicating media data such as audio and video to another device. However, the invention is not so limited, and another media data mechanism may be employed, including IAX, and the like. VOIP device 103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, VOIP device 103 may employ SIP over either UDP or TCP and RTP over UDP. Moreover, VOIP device 103 may employ any of a variety of real-time communication protocols useable for voice, video, text, instant messaging, or the like.

VOIP device 103 may also be configured to provide an identifier, sometimes known as an originating line identifier (OLI) during a communication. The identifier may employ any of a variety of mechanisms, including a device model number, a carrier identifier, a mobile identification number (MIN), and the like. The MIN may be a telephone number, a Mobile Subscriber Integrated Services Digital Network (MS-ISDN), an electronic serial number (ESN), or other device identifier. The OLI may also be an IP address associated with VOIP device 103. In one embodiment, the identifier is provided with each communication. In another embodiment, the identifier is provided by an end-user.

VOIP device 103 may connect directly to client device 102 or through a local area IP network (LAN) (not shown). Client device 102 may have a configuration menu that allows local client port and IP numbers to be configured. VOIP device 103 may connect to client device 102 using this configuration information, for example. When VOIP device 103 connects to client device 102, VOIP device may send a user ID and password that enables it to login to client device 102. Client device 102 may choose to perform local authentication and respond back to VOIP device 103, or send this information to SIP connection server 130, the IM connection server 120, or the like, for remote authentication and/or authorization.

Devices that may operate as VOIP device 103 include personal computers, desktop computers, smart phones, Personal Digital Assistants (PDAs), handheld computers, programmable consumer electronics, standard telephones configured with an analog telephone adaptor (ATA), an IP phone, a mobile device, and the like.

One embodiment of client device 102 is described in more detail below in conjunction with FIG. 2. Briefly, however, client device 102 may include virtually any computing device capable of receiving and sending a message over a network, to and from another computing device, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may be further configured to receive a message from VOIP device 103 in one format and to provide the message over network 105 in another format to a remote device such as IM connection servers 120, relay server 131, and the like. Client device 102 may employ a local proxy agent (not shown) that is configured to receive the message from VOIP device 103 and determine whether the message is to be transformed to such as the UDP protocol. If the message is employing the UDP protocol, the local proxy agent may convert the message format to another transport protocol, such as TCP, or the like. Client device 102 may also manage the message using an IM client (not shown). In one embodiment, the local proxy agent is integrated within the IM client. The local proxy agent may also transform the message using a port translation, encapsulation, or the like.

Client device 102 may further be configured to send the message over network 105 to IM connection servers 120, relay server 131, SIP connection server 130, and the like. Upon receipt of a response, such as from IM connection servers 120, relay server 131, SIP connection server 130, and the like, the local proxy agent may perform actions that may convert the received response into a format that is compatible to VOIP device 103. For example, the local proxy agent may convert the response to RTP and/or SIP over UDP, to employ TCP, or the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 may include any communication method by which information may travel between computing devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as might be included within client device 102, and the like. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions between client devices using any of a variety of IP telephony protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

One embodiment of relay server 131 is described in more detail below in conjunction with FIG. 3. Briefly, however, relay server 131 is configured to manage messages, such as media messages between one computing device and another, such as SIP connection server 130. Relay server 131 may, for example, receive a VOIP message that employs RTP over TCP. Relay server 131 may convert the VOIP message into RTP over UDP. However, the invention is not so limited, and relay server 131 may convert the message into virtually any other transport format. In one embodiment, relay server 131 may forward the message using RTP over TCP, virtually unconverted with respect to the transport protocol, towards SIP connection server 130.

Relay server 131 may be further configured to receive a response to the message from SIP connection server 130, and the like. In one embodiment, the response is in RTP over UDP format. In one embodiment, relay server 131 may convert the response format to RTP over TCP, and forward the converted response over network 105 towards its destination. Relay server 131, however, is not constrained to converting the transport layer to TCP. Thus, relay server 131 may convert the message and/or response to virtually any other message format, without departing from the scope or spirit of the invention. Devices that may operate as relay server 131 include personal computers, desktop computers, multiprocessor systems, microprocessor-based or programmable consumer electronics, network PCs, servers, firewalls, gateways, routers, and the like.

SIP connection server 130 is configured to receive a request to establish a SIP connection from client device 102, VOIP device 103, relay server 131, and the like. The requesting device may provide identification information to SIP connection server 130 that may be used, at least in part, to authenticate the request to establish the SIP connection. If the requesting device is authenticated, SIP connection server 130 may enable the requesting device to log into a connection. SIP connection server 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection server 130, and the like. User manager 134 may receive and manage such information for a plurality of requesting device. User manager 134 may also provide information to real-time event server 132 about at least one other requesting device, such that SIP connection server 130 may enable a VOIP communication between one or more end-users.

Illustrative Client Device

Figure 2:
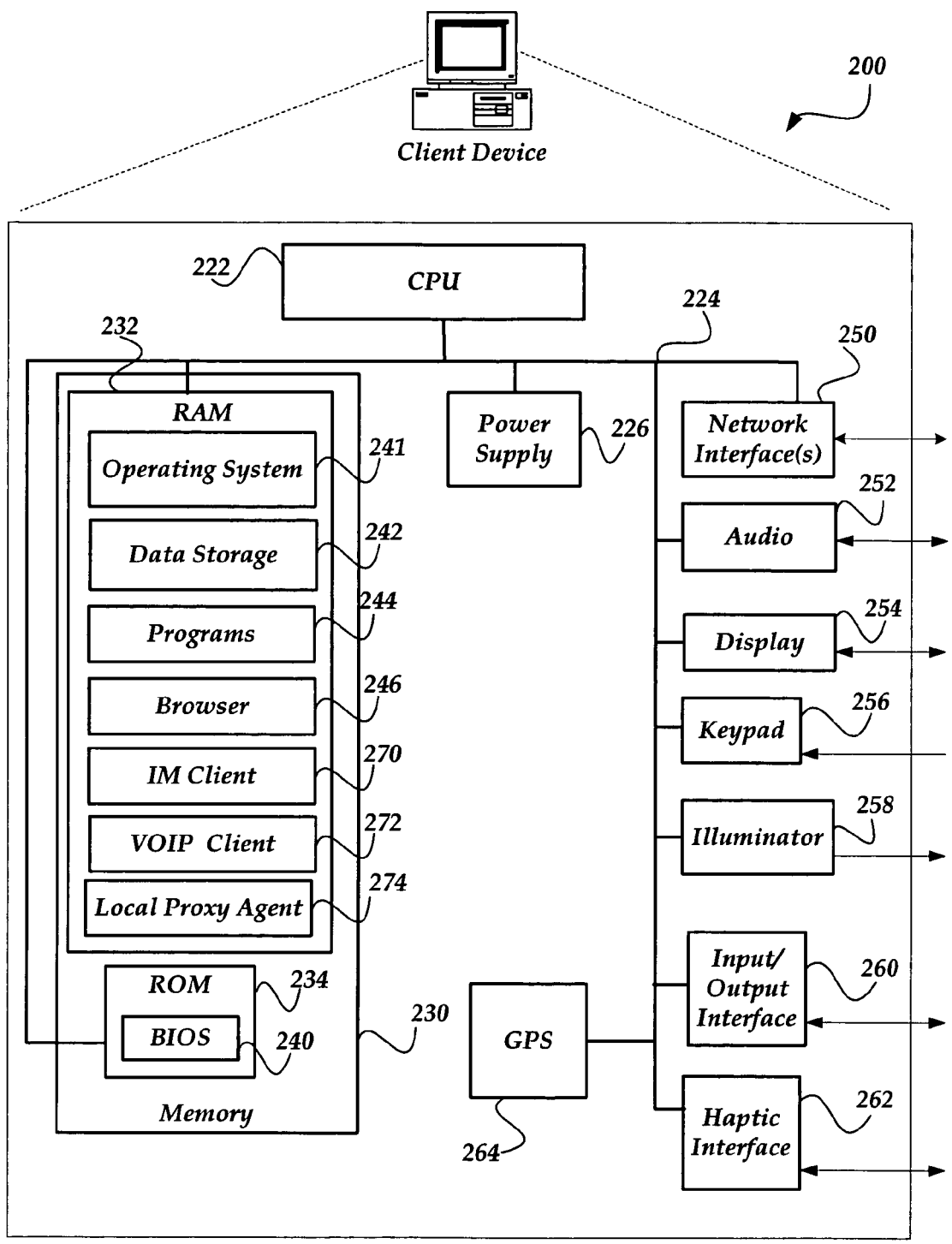
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth. In addition, mass memory 230 stores browser client 246, IM client 270, VOIP client 272, and local relay agent 274.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

IM client 270 may be configured to initiate and manage an instant messaging session, including, but not limited to AOL Instant Messenger, Yahoo! Messenger, NET Messenger Server, ICQ, and the like. In one embodiment, IM client 270 is configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP), and the like. VOIP client 272 is further configured to employ a variety of speech codecs to compress the media stream for communicating it over the network, including G.711, G.729, G.729a, iSAC, Speex, and the like. In one embodiment, SIP may be employed to enable a Session Description Protocol (SDP).

VOIP client 272 may further be configured to receive VOIP data and signals from a VOIP device, such as VOIP device 103 of FIG. 1. VOIP client 272 may then provide, at least the media data (RTP) traffic, and perhaps the SIP portion, to local relay agent 274 for possible conversion.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

Local proxy agent 274 is configured to receive a VOIP message and, as appropriate, convert it to another format. For example, local proxy agent 274 may receive a VOIP message that employs the SIP/RTP protocols. Local proxy agent 274 may examine a transport protocol used by the received VOIP message to determine if it is UDP, TCP, or the like. Local proxy agent 274 may then be further configured to convert the message, if it employs the UDP protocol. Local proxy agent 274 may, for example, convert the message to SIP over TCP and RTP over TCP. Local proxy agent 274 may also perform transport protocol conversion, for example, from TCP to UDP or UDP to TCP. Local proxy agent 274 may further perform a port translation such that the message may be forwarded over a pre-defined port number, and thereby further transliterating the message onto a port that is configured to operate with a real-time SIP server, such as SIP connection server 130 of FIG. 1. Local proxy agent 274 may also enable the converted message to be sent towards its destination over a network, such as network 105 of FIG. 1. Local proxy agent 274, however, may employ any of a variety of other conversions, transformations, and the like, upon the received message. For example, in one embodiment, local proxy agent 274 may receive the message and encapsulate it into another message format that is enabled to operate within a tunnel. Thus, in one embodiment, local proxy agent 274 may encapsulate the message into a format capable of running over an HTTP connection, an IM protocol connection, and the like.

Similarly, local proxy agent 274 may also be configured to receive a response to the message and, as appropriate, convert the response to another format. For example, the response may be configured as SIP/RTP over TCP. Local proxy agent 274 may convert this response to be RTP over UDP, and SIP over UDP or TCP, as appropriate for the destination device. Local proxy agent 274 may employ processes such as described below in conjunction with FIGS. 4-5 to perform at least some of the above actions. Moreover, as mentioned above, local proxy agent 274 may be integrated within IM client 270.

Illustrative Server Environment

Figure 3:
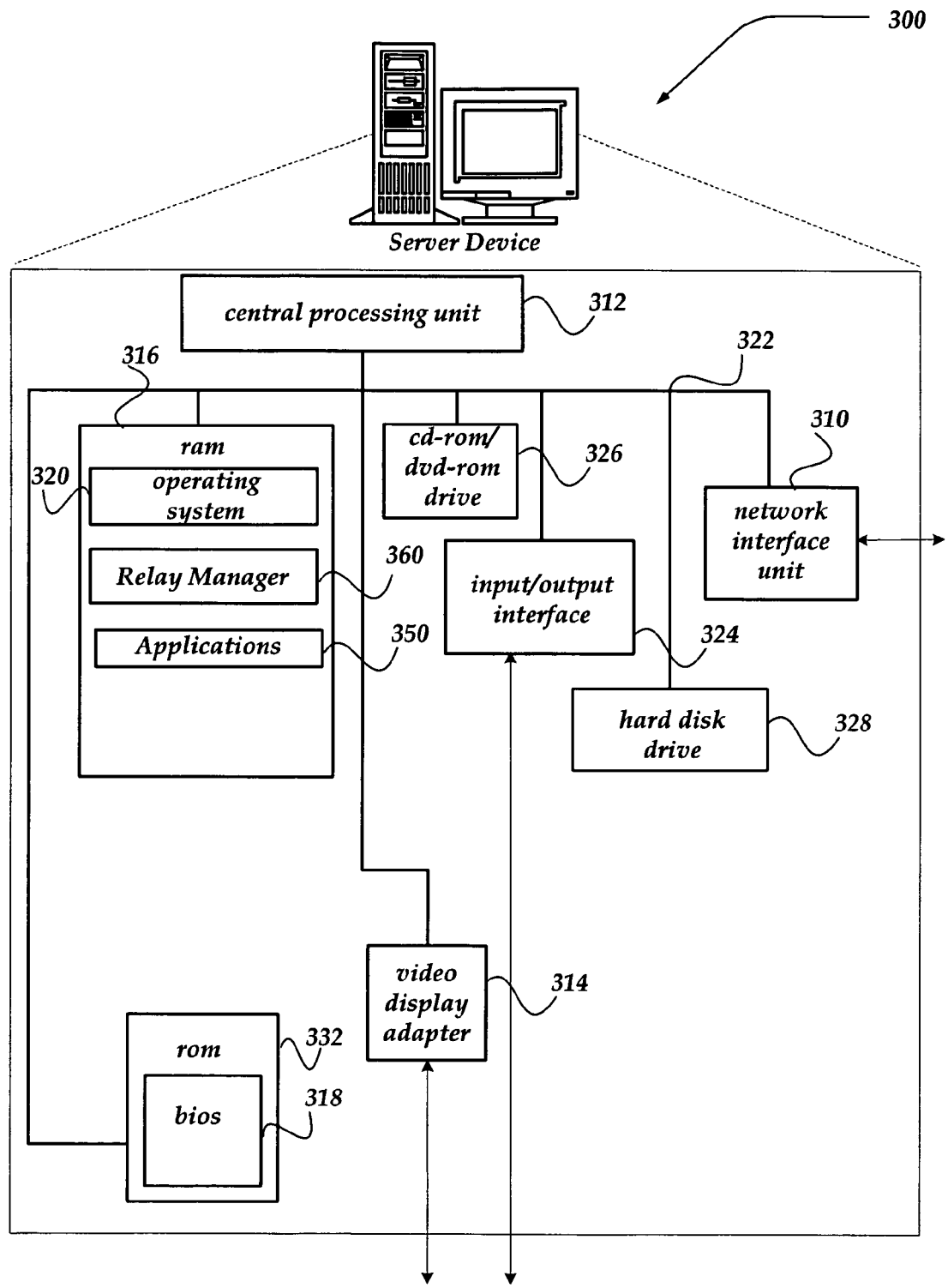
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, relay server 131 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Mass storage may further include applications such as relay manager 360.

Relay manager 360 may be configured to operate substantially similar to local proxy agent 274 of FIG. 2. That is, relay manager 360 may be configured to receive a VOIP message and as appropriate convert it to another format. For example, relay manager 360 may receive a message that employs SIP/RTP protocols over TCP. Relay manager 360 may then be configured to convert the message to SIP/RTP over UDP. However, relay manager 360 is not so constrained. For example, relay manager 360 may be configured, based on a predefined format employed by a destination server, to pass the received VOIP message through virtually unaltered with respect to its transport protocol. Relay manager 360 may also receive the message from one port, and perform a port translation on the message as it is forwarded to its destination.

Moreover, relay manager 360 may receive a response from a server, service, and the like, and determine if the response needs to be converted to another format, encapsulated into another message packet format, and the like. Relay manager 360 may then perform the appropriate transformation, conversion, encapsulation, and the like, and forward the response to the requesting device over a network.

Generalized Operation

Figure 4:
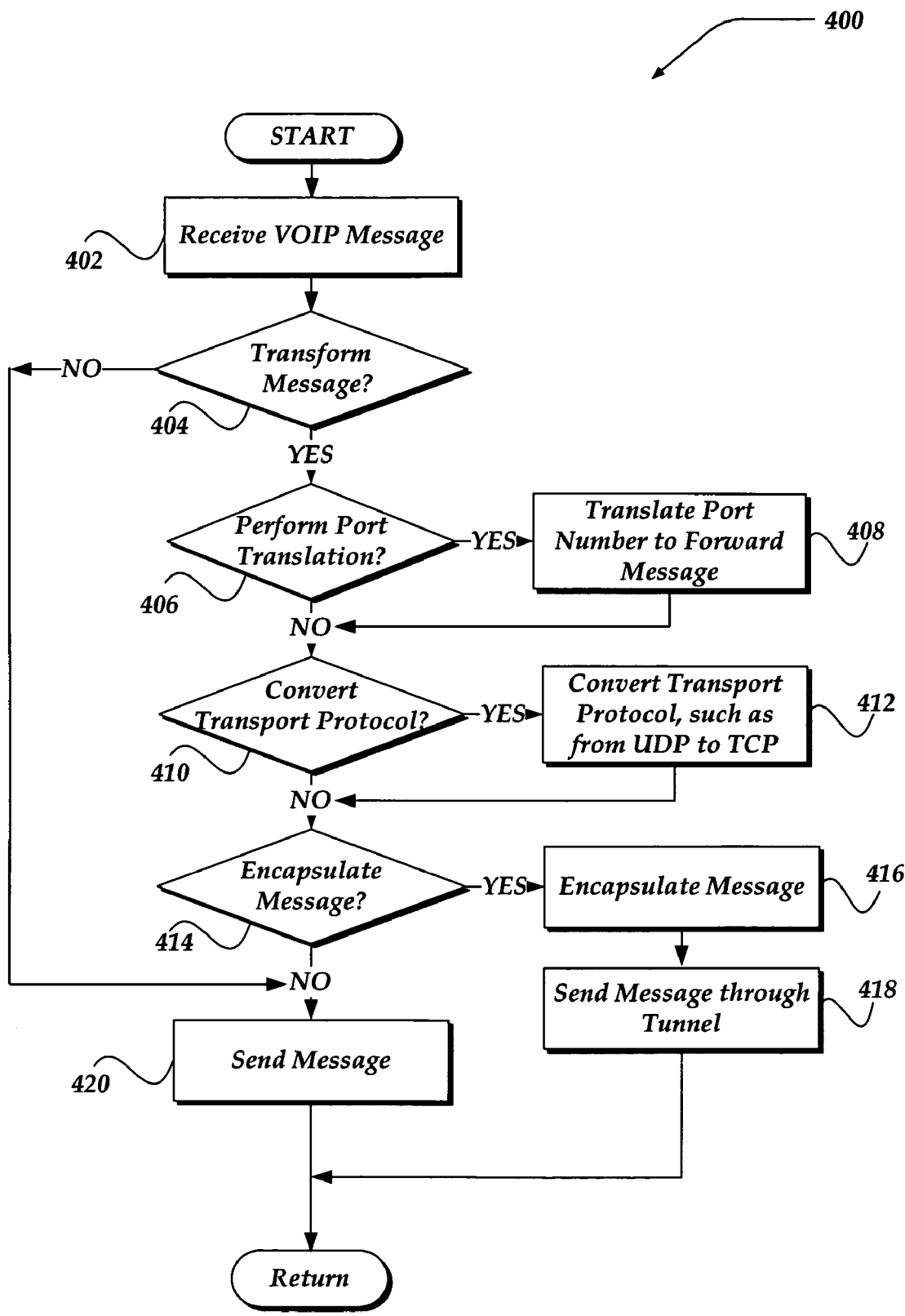
FIG. 4 illustrates a logical flow diagram generally showing one embodiment of a process for managing a VOIP message at a client.

The operation of certain aspects of the invention will now be described with respect to FIG. 4. FIG. 4 illustrates a logical flow diagram generally showing one embodiment of a client process for managing a relay of a VOIP message. Process 400 of FIG. 4 may be employed, for example, by local proxy agent 274 of FIG. 2 for a message received from a VOIP phone, and the like, that is to be sent across a network. In addition, process 400 may also be employed by relay manager 360 of FIG. 3 in managing a response to the message.

Process 400 begins, after a start block, at block 402, where a VOIP message is received. As described above, the VOIP message may be based on the SIP/RTP protocols. Moreover, in one embodiment, the VOIP message may employ UDP as a transport protocol. However, because many of today's VOIP devices may be unable to communicate messages structured in this format to a corresponding server provider, another computing device, and the like, it may be desirable to transform the message. This may be the case, for example, where some the other computing device resides behind a firewall, NAT, and the like, that is configured to block UDP, well-known UDP ports, such as 5060, and the like. Therefore, processing flows to decision block 404 where a determination is made whether to transform the received VOIP message. If the VOIP message is not to be transformed, processing flows to block 420; otherwise, processing continues to decision block 406.

At decision block 406, a determination is made whether a port translation is to be performed for the message. That is, shall the message transformation include employing a different port number to send the message? If port translation is to be performed, processing flows to block 408; otherwise, processing continues to decision block 410. At block 408, the message is provided to another port, such as one that is likely not to be blocked. In one embodiment, the port number employed is configured for use with RTP/TCP, and/or SIP/TCP. Processing then continues to decision block 410.

At decision block 410, a determination is made whether to convert a transport protocol for the message. In one example, the message is employs UDP and it is determined that the message is to be converted to the TCP format, or the like. If the transport protocol is to be converted, processing branches to block 412; otherwise, processing proceeds to decision block 414. At block 412, the transport protocol for the message is converted to TCP. Conversion of the message from UDP to TCP may include modifying a transport header, providing a timestamp, buffer, managing sequencing, and the like. Processing then proceeds to decision block 414.

At decision block 414, a determination is made whether the message is to be encapsulated so that a tunneling protocol may be employed to communicate the message. If the message is to be encapsulated, processing branches to block 416; otherwise, processing proceeds to block 420, where the message is sent over an appropriate network. For example, the message may have been transformed to employ a TCP/IP based network. Upon completion of block 420, processing returns to a calling process to perform other actions.

At block 416, any of a variety of encapsulation mechanisms may be employed upon the message. For example, the message may be encapsulated within an IM protocol message packet, an HTTP protocol packet, a security packet such as IP encapsulation security payload (ESP), and the like. Upon encapsulation of the message into another message packet, processing flows to block 418, where the encapsulated message is forwarded through a tunnel, over an HTTP connection, an IM communication link, or the like, that is configured to manage the encapsulated message. The tunnel, connection, link, or the like, may have been established and configured prior to encapsulating the message, or even currently with the encapsulation of a first message. In any event, processing then returns to a calling process to perform other actions.

Figure 5:
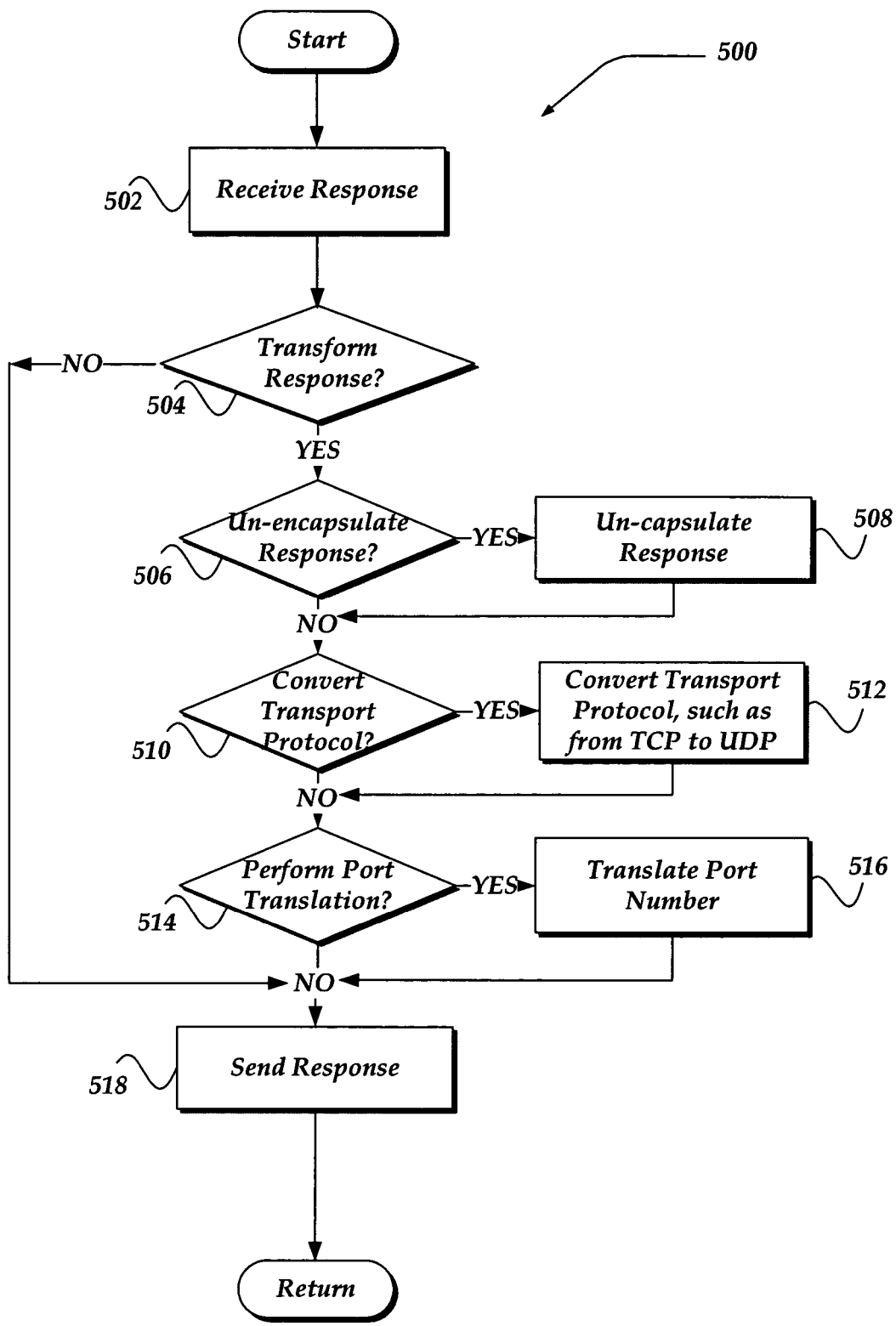
FIG. 5 illustrates a logical flow diagram generally showing one embodiment of a process for managing a receipt of VOIP traffic at the client, in accordance with the present invention.

Receiving a response to the message may be substantially similar to the above steps (in a reverse process). Thus, FIG. 5 illustrates a logical flow diagram generally showing one embodiment of a process for managing a receipt of VOIP traffic at the client, in accordance with the present invention. Process 500 of FIG. 5 may, for example, be performed by local proxy agent 274 of FIG. 2.

Process 500 begins, after a start block at 502, when a VOIP response message is received. In one embodiment, the response message may be transformed employing a process substantially similar to process 400 of FIG. 4. Thus, for example, the VOIP response message may have been encapsulated, port translated, and/or had its underlying it transport protocol converted, and the like. Processing thus continues to decision block 504, where a determination is made whether to perform a transformation. If no transformation is to be performed on the response message, processing flows to block 518; otherwise, processing continues to decision block 506.

At decision block 506, a determination is made whether the response is encapsulation and is to be un-encapsulated. If it is, processing flows to block 508; otherwise, processing flows to decision block 510. At block 508, the encapsulated response is un-encapsulated. Processing then proceeds to decision block 510.

At decision block 510, a determination is made whether the response is to have its transport protocol converted to another protocol. If it is, processing proceeds to block 512; otherwise, processing continues to decision block 514. At block 512, the transport protocol is converted. For example, the transport protocol may be converted from TCP to UDP, such as blocked UDP, or the like. Processing then proceeds to decision block 514.

At decision block 514, a determination is made whether the response is to have a port translation performed upon it. If it is to have a port translation, processing branches to block 516; otherwise, processing flows to block 518. At block 516, a port number translation may be performed. For example, the destination port number in the response may be transformed to another port number. Processing continues next to block 518, where the response is sent towards its destination.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended and hereafter introduced.

What is claimed as new and desired to be protected by Letters Patent of the United States is:

1. A method for use in managing a Voice over IP (VOIP) message over a network, comprising:
   receiving the VOIP message;
   if the VOIP message employs a user datagram transport protocol (UDP), converting the transport protocol to a transmission control protocol (TCP);
   if the VOIP message employs a UDP based port number, converting the VOIP message to employ a TCP based port number; and
   providing the converted VOIP message over the network, wherein the network employs a TCP transport protocol.

2. The method of claim 1, wherein the VOIP message employs a Session Initiation Protocol (SIP) or a Real-time Transport Protocol (RTP).

3. The method of claim 1, further comprising:
   encapsulating the VOIP message; and
   providing the encapsulated VOIP message through a tunnel over the network.

4. The method of claim 3, wherein the encapsulation further comprises encapsulating the VOIP message as within an encapsulation security payload (ESP).

5. The method of claim 1, wherein the method is implemented within a computing device, and wherein the VOIP message is received from an VOIP phone.

6. The method of claim 1, wherein the method is implemented as computer-readable instructions within an IM client application.

7. A client device for use in managing a Voice over IP (VOIP) message over a network, comprising:
   a transceiver for receiving and sending information to another computing device;
   a processor in communication with the transceiver; and
   a memory in communication with the processor and for use in storing data and machine instructions that causes the processor to perform a plurality of operations, including:
   receiving the VOIP message from a VOIP based device;
   if the VOIP message employs a user datagram transport protocol (UDP), converting the transport protocol to a transmission control protocol (TCP);
   if the VOIP message employs a UDP based port number, converting the VOIP message to employ a TCP based port number; and
   providing the converted VOIP message over the network, wherein the network employs a TCP transport protocol.

8. The client device of claim 7, where in the plurality of operations can be integrated into an Instant messaging client on a PC.

9. The client device of claim 7, further comprising a local configuration screen that is arranged to communicate with the plurality of operations and is arranged to provide a port number and IP address for which the VOIP device can communicate with the client device.

10. The client device of claim 7, wherein the plurality of operations further comprise:
    receiving an authentication message from the VOIP device over SIP; and
    using the authentication message, in part, to authenticate the VOIP device, wherein the authentication is performable at least one of locally at the client device, or remotely at a server device.

11. The client device of claim 7, wherein the VOIP message employs a Session Initiation Protocol (SIP) or a Real-time Transport Protocol (RTP).

12. The client device of claim 7, wherein the processor performs a plurality of operations, further comprising:
    encapsulating the VOIP message; and
    providing the encapsulated VOIP message through a tunnel over the network.

13. The client device of claim 7, wherein the client device is a mobile device.

14. The client device of claim 7, wherein the processor performs a plurality of operations, further comprising:
    encapsulating the VOIP message such that it is transportable over at least one of an HTTP connection, an IM protocol connection, or through a encrypted tunnel.

15. The client device of claim 7, further comprising:
    receiving a response to the VOIP message over the network;
    if the response employs the TCP transport protocol, converting the transport protocol to UDP;

if the response employs a TCP based port number, converting the response to employ a UDP based port number; and providing the converted response to the VOIP based device.

16. The client device of claim 7, wherein the machine instructions are integrated with an IM client application.

17. A server device for use in managing a Voice over IP (VOIP) message over a network, comprising:
- a transceiver for receiving and sending information to another computing device;
- a processor in communication with the transceiver; and
- a memory in communication with the processor and for use in storing data and machine instructions that causes the processor to perform a plurality of operations, including:
  - receiving the VOIP message over the network;
  - if the VOIP message employs the TCP transport protocol, converting the transport protocol to UDP;
  - if the VOIP message employs a TOP based port number, converting the response to employ a UDP based port number; and
  - providing the converted VOIP message to another computing device.

18. The server device of claim 17, wherein the other computing device is at least one of a SIP connection server, or an IM connection server.

19. A system for use in managing a Voice over IP (VOIP) message over a network, comprising:
- a VOIP device that is configured to provide and to receive VOIP messages, wherein the VOIP message employs SIP and RTP protocols;
- a client device in communication with the VOIP device that is configured to perform actions, including:
  - receiving a VOIP message from the VOIP device;
  - if the VOIP message employs a user datagram transport protocol (UDP), converting the transport protocol to a transmission control protocol (TCP);
  - if the VOIP message employs a UDP based port number, converting the VOIP message to employ a TCP based port number, and
- providing the converted VOIP message over the network, wherein the network employs a TCP transport protocol.

20. A method for use in managing a Voice over IP (VOIP) message over a network, comprising:
- receiving the VOIP message;
- if the VOIP message employs a user datagram transport protocol (UDP), converting the transport protocol to a transmission control protocol (TCP);
- providing the converted VOIP message over the network, wherein the network employs a TCP transport protocol;
- receiving a response to the VOIP message over the network;
- if the response employs the TCP transport protocol, converting the transport protocol to UDP;
- if the response employs a TCP based port number, converting the response to employ a UDP based port number; and
- providing the converted response to a VOIP based device.

* * * * *

UNITED STATES PATENT AND TRADEMARK OFFICE
CERTIFICATE OF CORRECTION

| | | |
|---|---|---|
| PATENT NO. | : 7,313,134 B2 | Page 1 of 1 |
| APPLICATION NO. | : 11/128634 | |
| DATED | : December 25, 2007 | |
| INVENTOR(S) | : Yarlagadda | |

It is certified that error appears in the above-identified patent and that said Letters Patent is hereby corrected as shown below:

On Sheet 5 of 5, in Fig. 5 (Box 508), line 1, delete "Un-capsulate" and insert -- Un-encapsulate --, therefor.

In column 14, line 6, in Claim 5, delete "an" and insert -- a --, therefor.

In column 14, line 62, in Claim 14, delete "a" and insert -- an --, therefor.

In column 15, line 20, in Claim 17, delete "TOP" and insert -- TCP --, therefor.

In column 16, line 10, in Claim 19, delete "," and insert -- ; --, therefor.

Signed and Sealed this

Sixth Day of May, 2008

JON W. DUDAS
*Director of the United States Patent and Trademark Office*